(12) United States Patent
Nomura et al.

(10) Patent No.: US 10,654,405 B2
(45) Date of Patent: May 19, 2020

(54) VEHICULAR LIGHT-EMITTING DEVICE

(71) Applicant: TS TECH CO., LTD., Asaka-shi, Saitama (JP)

(72) Inventors: Masahiro Nomura, Tochigi (JP); Noriyuki Yamato, Tochigi (JP); Kenichi Kamano, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/747,350

(22) PCT Filed: Jul. 28, 2016

(86) PCT No.: PCT/JP2016/072215
§ 371 (c)(1),
(2) Date: Jan. 24, 2018

(87) PCT Pub. No.: WO2017/018490
PCT Pub. Date: Feb. 2, 2017

(65) Prior Publication Data
US 2018/0215310 A1    Aug. 2, 2018

(30) Foreign Application Priority Data

Jul. 29, 2015 (JP) .................................. 2015-150057

(51) Int. Cl.
*B60Q 1/26* (2006.01)
*F21S 43/14* (2018.01)
(Continued)

(52) U.S. Cl.
CPC ........... *B60Q 1/2696* (2013.01); *B60Q 1/263* (2013.01); *F21S 41/143* (2018.01); *F21S 41/147* (2018.01);
(Continued)

(58) Field of Classification Search
CPC ........ B60Q 1/2696; B60Q 1/263; B60Q 3/66; G02B 3/0056; F21V 5/048; F21V 17/16;
(Continued)

(56) References Cited

U.S. PATENT DOCUMENTS 7,275,849 B2 * 10/2007 Chinniah ............... F21V 7/0091
362/555
2003/0035298 A1 * 2/2003 Amano ................ B60Q 1/2607
362/518
(Continued)

FOREIGN PATENT DOCUMENTS

DE  10 2013 110 344 A1   3/2015
JP      H04-040352 U      4/1992
(Continued)

OTHER PUBLICATIONS

Extended European Search Report issued in related application EP 16830595.1, dated Jun. 27, 2018, 8 pages.

*Primary Examiner* — Andrew J Coughlin
*Assistant Examiner* — Nathaniel J Lee
(74) *Attorney, Agent, or Firm* — Faegre Drinker Biddle & Reath LLP (57) ABSTRACT

The present disclosure enables lighting performance which appears as if there are more light sources than the actual number of light sources, and reduces brightness unevenness. A vehicular light-emitting device includes a plurality of light-emitting units, each of which includes an LED part and a lens configured to diffuse and emit the light received from the LED part, the plurality of light-emitting units being arranged side by side. The plurality of light-emitting units are arranged so that one or more brightness peak values exist between adjacent light-emitting units. Moreover, the light emitted from the lenses of the light-emitting units has a plurality of brightness peaks with respect to the spreading direction of the light, and the arrangement interval of the
(Continued)

plurality of light-emitting units is set so that the plurality of brightness peaks of the light emitted from the plurality of light-emitting units are aligned at substantially equal intervals.

11 Claims, 10 Drawing Sheets

(51) Int. Cl.

| | |
|---|---|
| F21S 43/15 | (2018.01) |
| F21S 43/20 | (2018.01) |
| F21S 43/31 | (2018.01) |
| F21S 43/19 | (2018.01) |
| F21S 43/00 | (2018.01) |
| F21S 43/40 | (2018.01) |
| F21S 41/147 | (2018.01) |
| F21S 43/30 | (2018.01) |
| F21S 41/143 | (2018.01) |
| F21Y 115/10 | (2016.01) |
| F21Y 103/10 | (2016.01) |

(52) U.S. Cl.
CPC ............. *F21S 43/00* (2018.01); *F21S 43/14* (2018.01); *F21S 43/15* (2018.01); *F21S 43/19* (2018.01); *F21S 43/20* (2018.01); *F21S 43/26* (2018.01); *F21S 43/30* (2018.01); *F21S 43/31* (2018.01); *F21S 43/40* (2018.01); *F21Y 2103/10* (2016.08); *F21Y 2115/10* (2016.08)

(58) Field of Classification Search
CPC .... F21V 17/164; F21V 19/001; F21V 19/002; F21V 19/004; F21S 43/27; F21S 43/00; F21S 43/14; F21S 43/15; F21S 43/19; F21S 43/20; F21S 43/263; F21S 43/31; F21S 43/40

See application file for complete search history.

(56) References Cited

U.S. PATENT DOCUMENTS

| | | |
|---|---|---|
| 2003/0174514 A1 | 9/2003 | Natsume |
| 2006/0044806 A1* | 3/2006 | Abramov ................. F21V 5/007 |
| | | 362/337 |
| 2010/0265721 A1* | 10/2010 | Zhou ......................... F21K 9/00 |
| | | 362/311.01 |
| 2010/0271818 A1 | 10/2010 | Smith |
| 2012/0081619 A1* | 4/2012 | Shimizu ............ G02F 1/133603 |
| | | 348/790 |
| 2013/0063952 A1* | 3/2013 | Ikeda ......................... F21V 5/04 |
| | | 362/311.01 |
| 2013/0329444 A1 | 12/2013 | Oh |
| 2016/0084469 A1 | 3/2016 | Fukui et al. |
| 2016/0208996 A1 | 7/2016 | Mugge |

FOREIGN PATENT DOCUMENTS

| | | |
|---|---|---|
| JP | H11-084490 A | 3/1999 |
| JP | 2003-059312 A | 2/2003 |
| JP | 2003-086007 A | 3/2003 |
| JP | 2012-017063 A | 1/2012 |
| JP | 2012-145829 A | 8/2012 |
| JP | 2015-002032 A | 1/2015 |
| WO | 2015/004910 A1 | 1/2015 |

* cited by examiner

VEHICULAR LIGHT-EMITTING DEVICE

CROSS REFERENCE TO RELATED APPLICATIONS

This application is a National Stage Entry application of PCT Application No. PCT/JP2016/072215, filed Jul. 28, 2016, which claims the priority benefit of Japanese Patent Application No. JP 2015-150057, filed Jul. 29, 2015, the contents being incorporated herein by reference.

BACKGROUND

The present disclosure relates to a vehicular light-emitting device and, more specifically, to a vehicular light-emitting device provided with a plurality of light sources.

Some vehicular light-emitting devices are provided with a plurality of light sources. Such a vehicular light-emitting device may exhibit various lighting effects by lighting up the plurality of light sources simultaneously or sequentially.

For example, in Japanese Patent Publication JP 2012-17063 A, in a vehicular light-emitting device provided with a plurality of LEDs, in order to suppress brightness unevenness from being generated in the emitted light from the LEDs, a structure for reflecting the light from each LED and diffusing the light widely is provided.

In order to suppress brightness unevenness of the plurality of light sources, if the lights from the plurality of light sources are reflected and mixed, there is a fear that identification of which light source of the plurality of light sources is lit is ambiguous and the performance property of illumination is reduced. On the other hand, if the number of the light sources is increased, there are concerns in terms of power consumption and cost.

SUMMARY

The present disclosure has been made in view of the above problems, and an embodiment of the present disclosure provides a vehicular light-emitting device enabling lighting performance which appears as if there are more light sources than the actual number of light sources, and configured to reduce brightness unevenness.

In an embodiment, a vehicular light-emitting device in which a plurality of light-emitting units, each of which includes a light source and a lens configured to diffuse and emit the light received from the light source, are arranged side by side, and one or more brightness peak values exist between the plurality of light-emitting units.

In the above-described vehicular light-emitting device, one or more brightness peaks exist even between the plurality of light-emitting units, each of which includes the light source, thereby enabling performance which appears as if there are more light sources than the actual number of light sources, and configured to reduce brightness unevenness.

In the above-described vehicular light-emitting device, the light emitted from the lenses of the light-emitting units has a plurality of brightness peaks with respect to the spreading direction of the light, and an arrangement interval of the plurality of light-emitting units is set so that the plurality of brightness peaks of the light emitted from the plurality of light-emitting units are aligned at substantially equal intervals. Thereby, the plurality of brightness peaks of the light irradiated from the plurality of light-emitting units are at substantially equal intervals, and therefore brightness unevenness can be further reduced.

In the above-described vehicular light-emitting device, a holding part configured to hold the plurality of light-emitting units is included, and the holding part may have a reflection part configured to reflect the light emitted from the lenses toward a light-emitting surface. Thereby, the irradiation direction of the light can be adjusted.

In the above-described vehicular light-emitting device, the reflection part may be formed with a convex part at a position facing the light source. Thereby, the reflection direction of the light at the reflection part can be adjusted, and further brightness unevenness also can be reduced.

In the above-described vehicular light-emitting device, the holding part may be formed with a concave part between the regions which hold the plurality of light-emitting units. Thereby, the reflection direction from the holding part side is controlled, and brightness unevenness can be reduced.

In the above-described vehicular light-emitting device, a cover which engages with the holding part and covers the plurality of light-emitting units is included, and the cover is configured with a shape so that at an end portion of the cover on an emission side of the light in the lens of a light-emitting unit, the lens and the cover are closest to each other. Thereby, the light can be prevented from diffusing to the cover side.

In the above-described vehicular light-emitting device, each lens has locking pawl parts at both ends, and may be fixed to the holding part with a snap-fit by the locking pawl parts. Thereby, the lens can be stably mounted to the holding part.

In the above-described vehicular light-emitting device, each lens may be formed with a rib configured to regulate rotation with respect to the holding part. Thereby, rotation of the lens with respect to the holding part is regulated, and therefore the irradiation direction of the light can be stabilized. Further, movement of the lens due to vibration of a vehicle is also regulated, and therefore the generation of sounds due to a collision of the lens with another member (e.g., vibration noise) is also regulated.

In the above-described vehicular light-emitting device, each lens may be formed with a notch in a position facing the light source. Thereby, the light entering the lens can be refracted in the spreading direction.

In the above-described vehicular light-emitting device, the lenses may have light source introduction parts provided on both sides of the notches and protruded to the light source side. Thereby, the position of the light source with respect to the lens is easy to define, and therefore positioning accuracy of the light source and the lens can be improved.

According to an embodiment of the present disclosure, lighting performance which appears as if there are more light sources than the actual number of light sources is provided, and brightness unevenness can be reduced.

According to an embodiment of the present disclosure, the plurality of brightness peaks of the light irradiated from the plurality of light-emitting units are at substantially equal intervals, and therefore brightness unevenness can be further reduced.

According to an embodiment of the present disclosure, the irradiation direction of the light can be adjusted.

According to an embodiment of the present disclosure, the reflection direction of the light at the reflection part can be adjusted, and further brightness unevenness also can be reduced.

According to an embodiment of the present disclosure, the reflection direction from the holding part side is controlled, and brightness unevenness can be reduced.

According to an embodiment of the present disclosure, the light can be prevented from diffusing to the cover side.

According to an embodiment of the present disclosure, the lens can be stably mounted to the holding part.

According to an embodiment of the present disclosure, rotation of the lens with respect to the holding part is regulated, and therefore the irradiation direction of the light can be stabilized.

According to an embodiment of the present disclosure, the light entering the lens can be refracted in the spreading direction.

According to an embodiment of the present disclosure, the position of the light source with respect to the lens is easy to define, and therefore positioning accuracy of the light source and the lens can be improved.

BRIEF DESCRIPTION OF DRAWINGS

Various embodiments of the invention are illustrated in the drawings, in which:

FIG. 8 shows an example configuration of a lens in a case where a rotation regulating mechanism is provided, where

DETAILED DESCRIPTION

Hereinafter, a vehicular light-emitting device according to embodiments of the present disclosure is described with reference to FIG. 1 to FIG. 13.

The present embodiment relates to an invention of a vehicular light-emitting device in which a plurality of light-emitting units, where each of the plurality of light-emitting units includes a light source and a lens configured to diffuse and emit light received from the light source, where the plurality of light-emitting units are arranged side by side, and arranged so that even between the plurality of light-emitting units, one or more brightness peak values exist.

First Embodiment

Firstly, based on FIG. 1 to FIG. 5, a vehicular light-emitting device 1 according to a first embodiment of the present disclosure is described.

Figure 1:
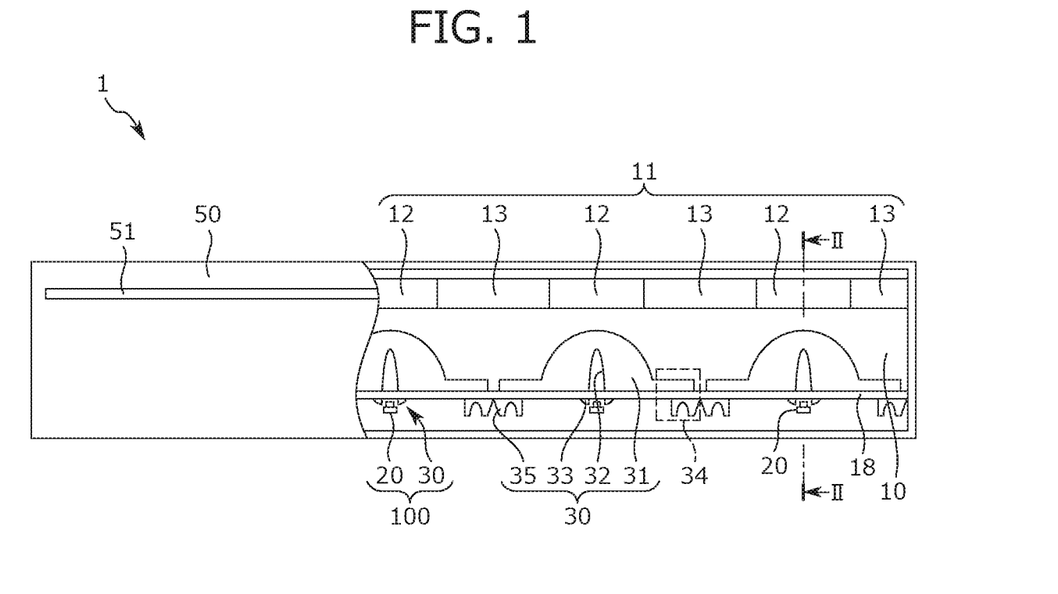
FIG. 1 is a plan view of a vehicular light-emitting device according to a first embodiment.
Figure 2:
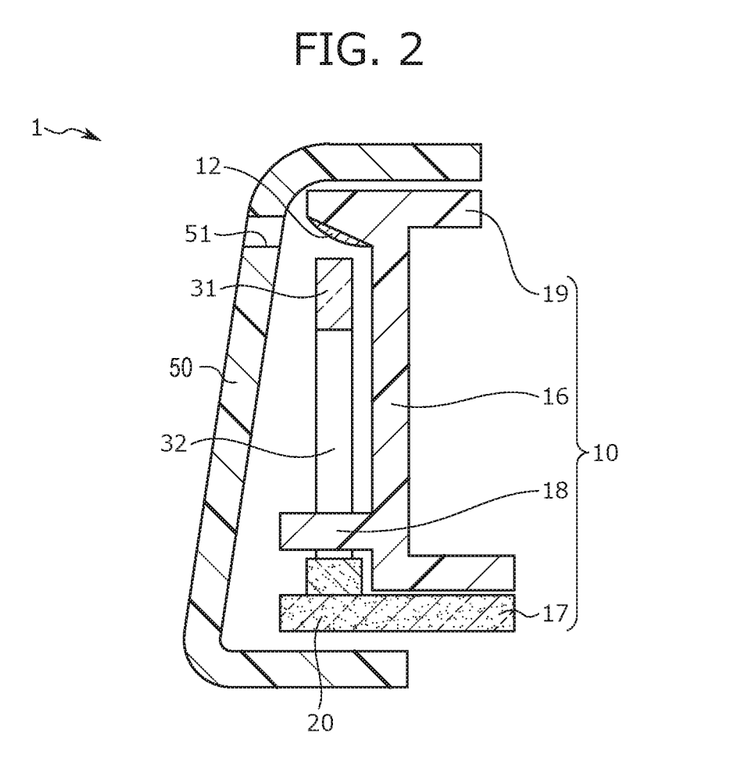
FIG. 2 is a cross-sectional view in II-II of FIG. 1.
Figure 3:
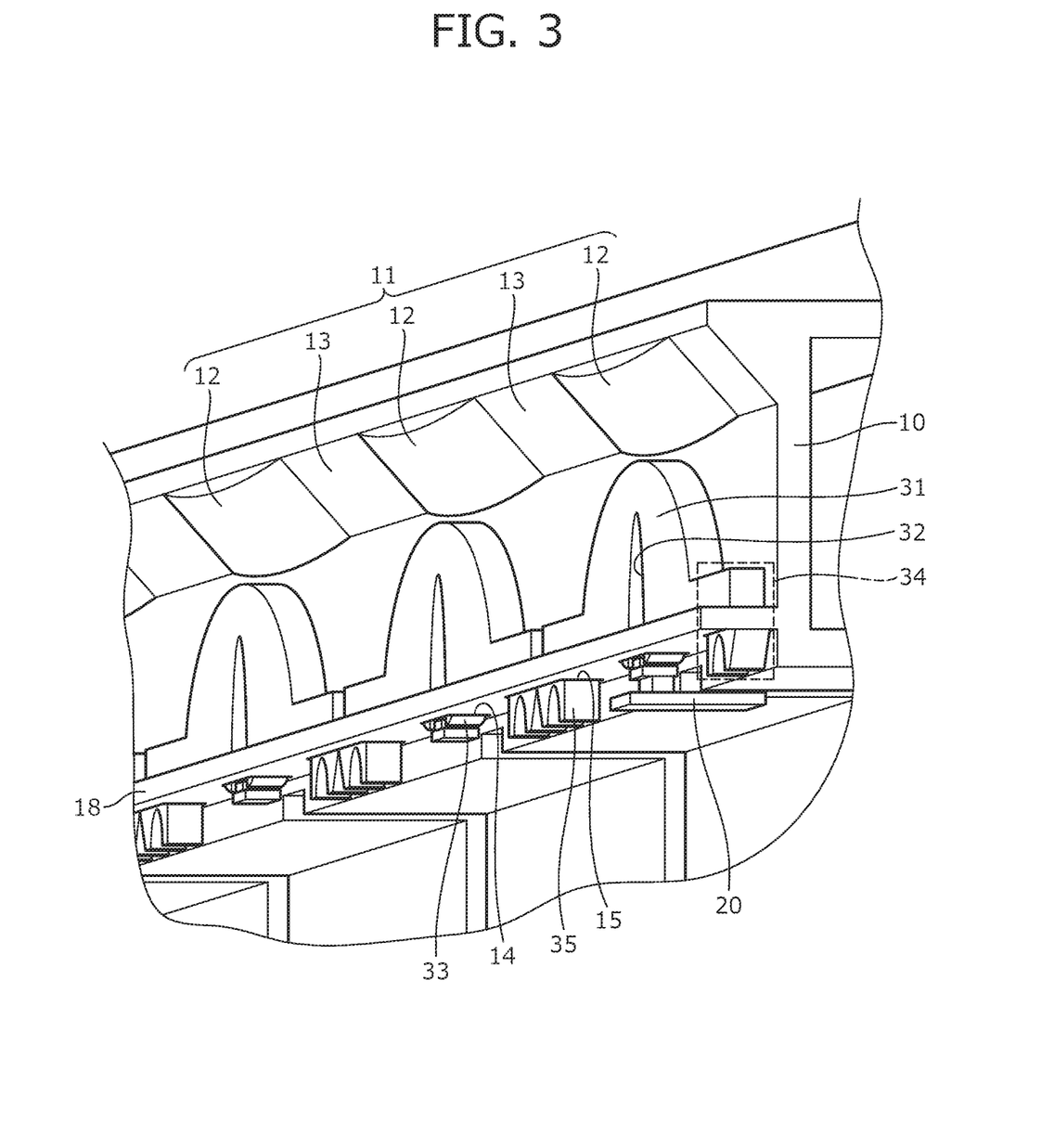
FIG. 3 is a perspective view of a state where a cover of the vehicular light-emitting device according to the first embodiment is removed.

FIG. 1 is a plan view of the vehicular light-emitting device 1 according to the first embodiment. FIG. 2 is a cross-sectional view in II-II of FIG. 1. FIG. 3 is a perspective view of a state that a cover 50 of the vehicular light-emitting device 1 is removed.

As shown in FIG. 1, the vehicular light-emitting device 1 mainly includes the cover 50, LED parts 20 serving as light sources, lenses 30 for diffusing and emitting the light entered from the LED parts 20, and a holder 10 (a holding part) which holds the LED parts 20, the lenses 30 and the like. Moreover, in the holder 10, a mirror-finished reflection part 11 that includes convex parts 12 and planar parts 13 is provided, and the refracted light from the lenses 30 is reflected toward a window part 51 (a light-emitting surface) by the reflection part 11. It should be noted that, in the following description, the emitting direction (that is, the side toward a notch part from the LED part 20) of the LED parts 20 is assumed to be a forward direction, the reverse direction thereof is assumed to be a backward direction, the side away from the center of the lenses 30 is assumed to be an outside, and the reverse side thereof is assumed to be an inside.

As shown in FIG. 1, the lens 30 includes a lens body part 31, a notch part 32, a light source introduction part 33, and mounting structure parts 34. The notch part 32 is provided in a position which is the center of the lens body part 31 and faces the LED part 20. The light source introduction part 33 protrudes to the LED part 20 side in the rear side of the notch part 32, and introduces the incident light from the LED part 20. The mounting structure parts 34 are portions which protrude toward the outside from both sides of the lens body part 31 and are configured to mount the lens 30 to the holder 10. In addition, in a rear side end portion of the mounting structure part 34, a locking pawl part 35 is provided, and the lens 30 is fixed to the holder 10 with a snap-fit by the locking pawl part 35.

Here, as shown in FIG. 1, with respect to the curvature (for example, a mean curvature) of a front edge portion of the lens body part 31, the curvature of the notch part 32 is larger. It should be noted that the curvature of the front edge portion of the lens body part 31 may be constant or may be not constant. If it is not constant, for example, the curvature of the center of the front edge portion may be smaller than the curvature of the outside of the center.

Moreover, as shown in FIG. 1 to FIG. 3, each single LED part 20 is arranged in a serial direction with respect to a plurality of lenses 30, and the LED part 20 and the lens 30 arranged in series therewith are formed into a light-emitting unit 100. The above serial direction is a direction in which a center axis of the lens 30 and an optical axis of the LED part 20 are parallel (including coincident). As thus described, the light-emitting unit 100 is configured by serially arranging the LED part 20 and the lens 30, thereby the light-emitting unit 100 can be manufactured with a thinner profile. By mounting the thinned light-emitting unit 100, the vehicular light-emitting device 1 can be thinned, and therefore the degree of freedom of installation thereof to a vehicle can be increased.

As shown in FIG. 1, the vehicular light-emitting device 1 includes a plurality of light-emitting units 100. The plurality of light-emitting units 100 are arranged in parallel with a longitudinal direction of the window part 51. Here, as shown in FIG. 1 and FIG. 3, in the reflection part 11, the convex part 12 is provided at a position facing the light-emitting unit 100 (that is, the LED part 20), and the planar part 13 is provided between positions facing the light-emitting unit 100 and the adjacent light-emitting unit 100 respectively (that is, between the convex part 12 and the convex part 12). In this way, the reflection direction of light in the reflection part 11 is adjustable, and further brightness unevenness can be reduced.

As shown in FIG. 2, the cover 50 has a shape inclined to the lens 30 side from backward to forward of the lens 30. In particular, the cover 50 and the lens 30 are located closest to each other in a front end portion of the lens 30. Thereby, the light emitted from the front end portion of the lens 30 can be suppressed from being reflected on the cover 50 and being returned to the rear side than the window part 51. Thereby, brightness of the light emitted from the window part 51 to the exterior of the vehicular light-emitting device 1 can be suppressed from being reduced. It should be noted that, in the following, the window part 51 side of the vehicular light-emitting device 1 is assumed to be the light-emitting surface side, and the opposite side thereof is assumed to be the back surface side.

Moreover, as shown in FIG. 2, the holder 10 has a holder base part region 16, an LED mounting region 17, a lens fixing region 18, and a reflection part forming region 19. The holder base part region 16 is a portion extending backward from forward. The LED mounting region 17 is a portion which extends to the back surface side in a rear end portion of the holder base part region 16 and to which the LED part 20 is mounted and fixed. The lens fixing region 18 is a portion which extends to the light-emitting surface side from the holder base part region 16 and to which the lens 30 is mounted and fixed. The reflection part forming region 19 is a portion which extends to both sides of the light-emitting surface side and the back surface side in a front end portion of the holder base part region 16 and in which the reflection part 11 is provided on an inclined surface, which is the light-emitting surface side, facing the lens 30. Here, the angle (the inclination angle) of the reflection surface may be set so that the intensity of the reflection light to the window part 51 from the lens 30 becomes a maximum.

Moreover, as shown in FIG. 3, in the lens fixing region 18 of the holder 10, an insertion hole 14, into which the light source introduction part 33 of the lens 30 is inserted, and an insertion hole 15, into which the rear end portion (including the locking pawl part 35) of the mounting structure part 34 of the lens 30 is inserted, are provided respectively.

Moreover, to the LED part 20, a control circuit (not shown) is connected, and timing of each of the plurality of LED parts 20 is controlled by the control circuit. Thereby, the plurality of LED parts 20 are made to emit light simultaneously, individually, or flowingly right and left, thereby various lighting effects can be exhibited.

Figure 4:
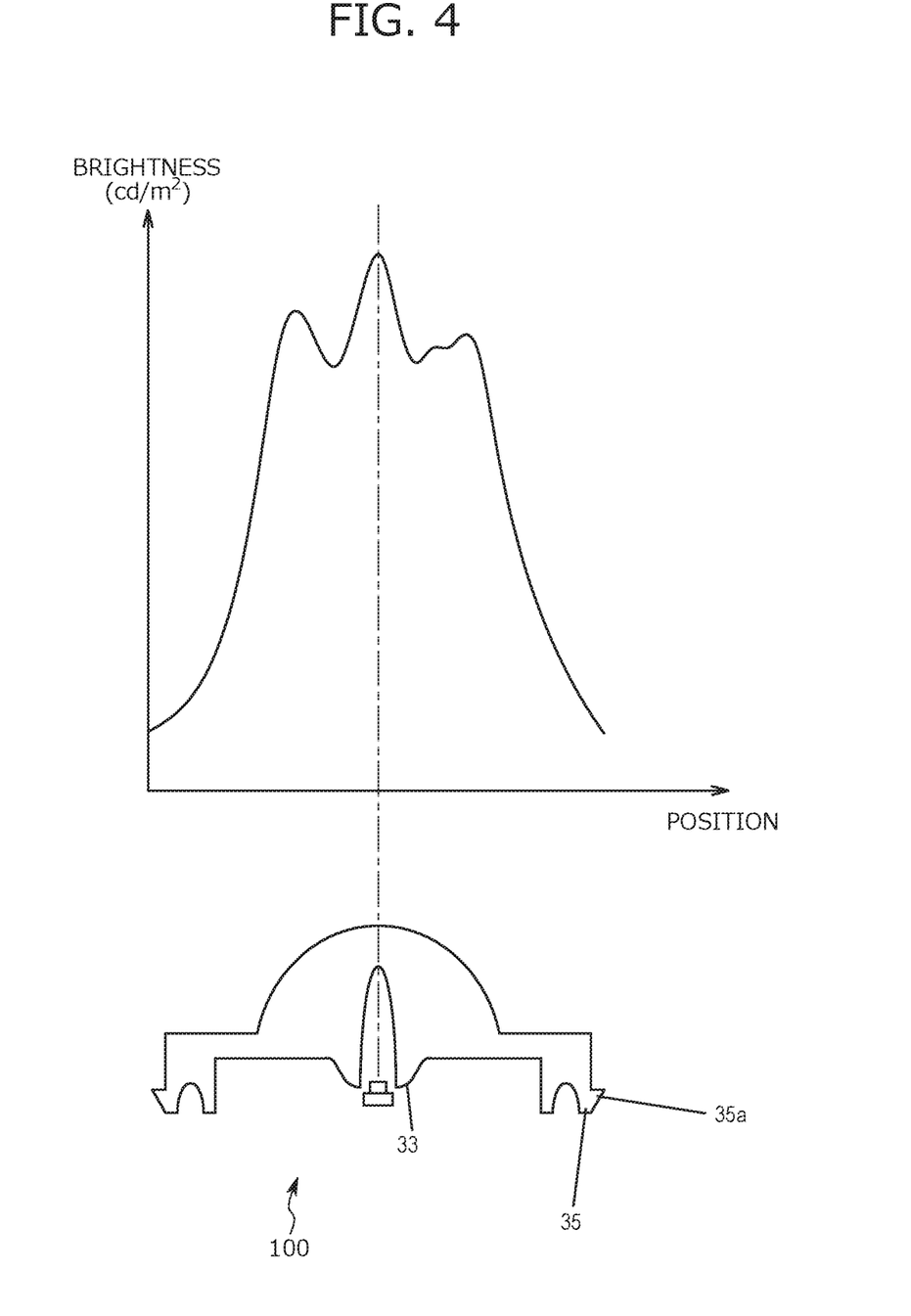
FIG. 4 is a diagram showing the characteristics of brightness peaks of a light-emitting unit in the vehicular light-emitting device according to the first embodiment.
Figure 5:
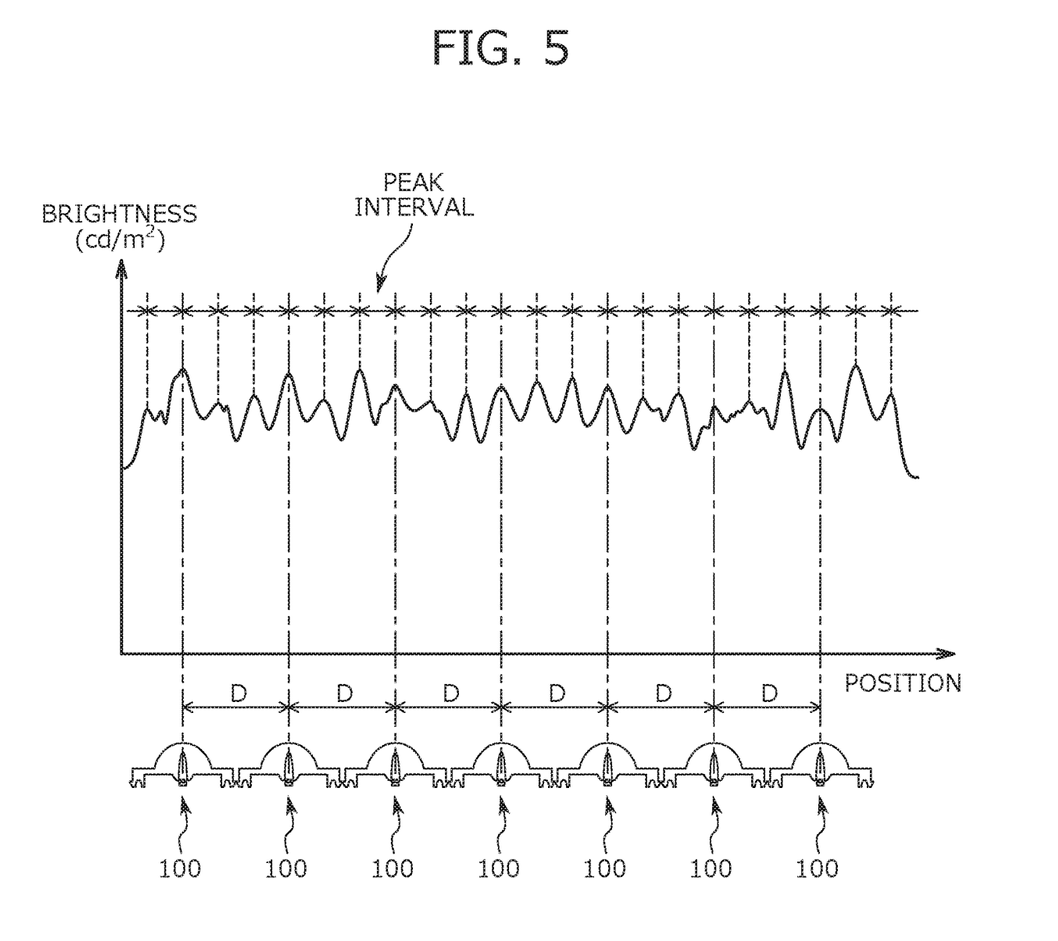
FIG. 5 is a diagram showing the characteristics of brightness peaks of a plurality of light-emitting units, of which arrangement interval is set, in the vehicular light-emitting device according to the first embodiment.

Next, based on FIG. 4 and FIG. 5, the brightness characteristics of the light-emitting unit 100 and the brightness characteristics of the plurality of light-emitting units 100 included in the vehicular light-emitting device 1 according to the first embodiment is described.

In FIG. 4, the brightness characteristics of a single light-emitting unit 100 are shown. FIG. 4 shows a relationship between the position in the light-emitting surface on the front side (that is, the position in the width direction of the light-emitting surface) of the single light-emitting unit 100 and the brightness. As shown in FIG. 4, in the light-emitting unit 100, there is a first brightness peak at a position passing through the center of the notch part 32 from the LED part 20, and further, two brightness peaks (a second brightness peak and a third brightness peak) exist also on the right and left sides of the first brightness peak. As thus described, depending on the shape (in particular, the size and the curvature) of the lens body part 31 of the lens 30 and the shape (in particular, the size and the curvature) of the notch part 32, a plurality of brightness peaks will appear in the spreading direction of the light emitted from the light-emitting unit 100.

Moreover, in FIG. 5, the brightness characteristics in a case where the plurality of light-emitting units 100 are arranged in a predetermined arrangement interval (D) are shown. FIG. 5 shows a relationship between the position in the light-emitting surface on the front side of the plurality of light-emitting units 100 and the brightness. As shown in FIG. 5, by adjusting the arrangement interval of the light-emitting units 100, the brightness peaks in the light-emitting surface can be at substantially equal intervals. As thus described, by adjusting the arrangement interval of the light-emitting units 100, brightness peaks exist even between the positions facing the light-emitting units 100 on the light-emitting surface. Thereby, lighting performance which appears as if there are more light sources than the number of light-emitting units 100 (that is, the actual number of light sources) is provided, and brightness unevenness can be reduced. Moreover, by setting the brightness peaks at substantially equal intervals, brightness unevenness can be further reduced.

Second Embodiment

Figure 6:
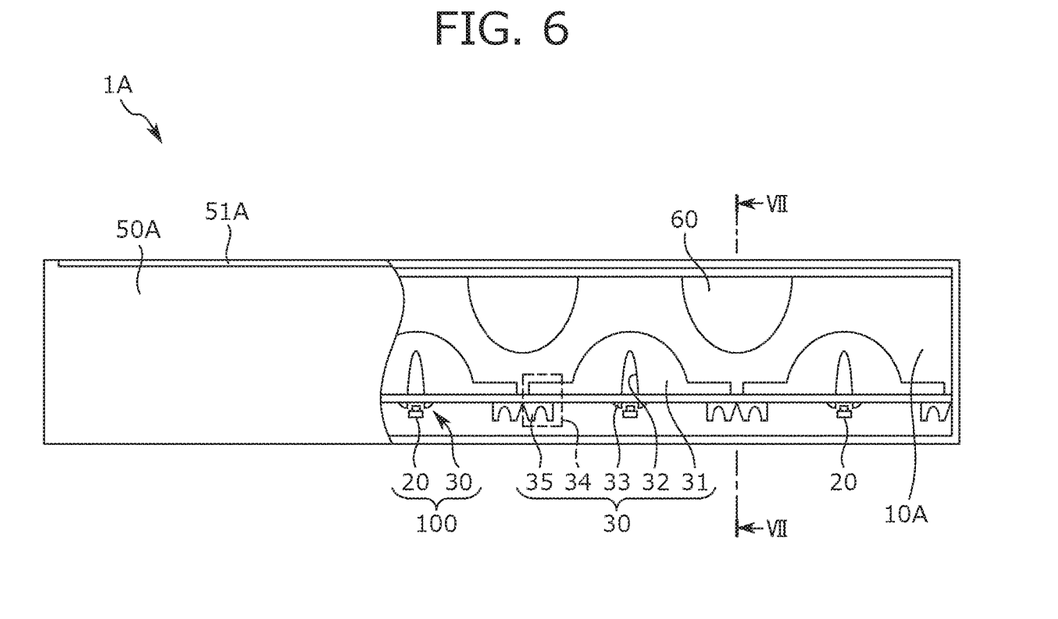
FIG. 6 is a plan view of a vehicular light-emitting device according to a second embodiment.
Figure 7:
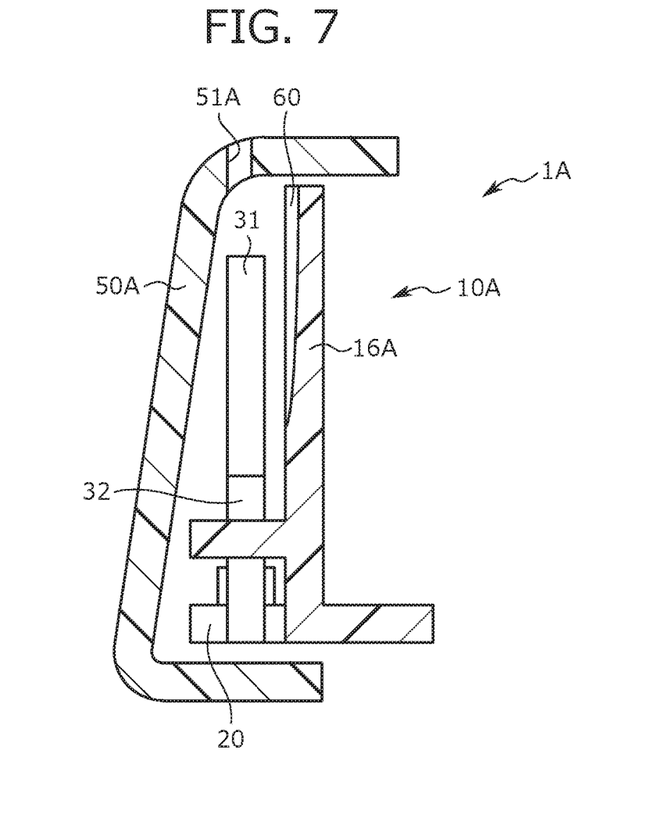
FIG. 7 is a cross-sectional view in VII-VII of FIG. 6.

Next, based on FIG. 6 and FIG. 7, a vehicular light-emitting device 1A according to a second embodiment of the present disclosure is described.

FIG. 6 is a plan view of the vehicular light-emitting device 1A according to the second embodiment. FIG. 7 is a cross-sectional view in VII-VII of FIG. 6. It should be noted that since the light-emitting unit 100 mounted in the vehicular light-emitting device 1A according to the second embodiment is similar to that of the first embodiment, the description thereof is omitted. In the following, the differences from the first embodiment are mainly described.

As shown in FIG. 6 and FIG. 7, in the vehicular light-emitting device 1A according to the second embodiment, the structures of a cover 50A and a holder 10A are different from that of the vehicular light-emitting device 1 according to the first embodiment. That is, as shown in FIG. 7, the second embodiment is different from the first embodiment in that the light-emitting unit 100 and a window part 51A of the cover 50A are arranged in a serial direction, and the reflection part forming region 19 is not provided in the holder 10A. Furthermore, the second embodiment is different from the first embodiment in that in a surface between the adjacent light-emitting units 100 which is the light-emitting surface side of a base part (a holder base part region 16A) of the holder 10A, a bowl-shaped concave part 60 is formed. In addition, the concave part 60 is formed so that the width thereof is gradually reduced from the front end portion of the holder base part region 16A to about a position of the center of the lens 30.

As described above, by forming the bowl-shaped concave part 60 in the holder base part region 16A, the reflection direction from the holder 10A side is controlled, and brightness unevenness can be reduced.

Figure 8A:
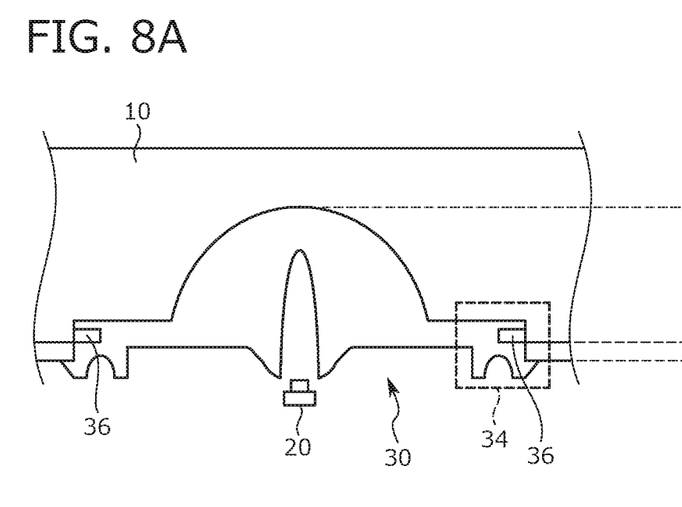
FIG. 8A is a plan view of the light-emitting unit including the lens.
Figure 8B:
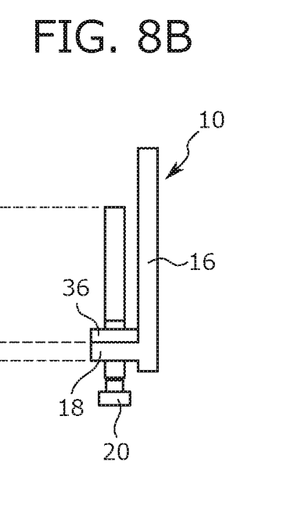
FIG. 8B is a side view of FIG. 8A.
Figure 9:
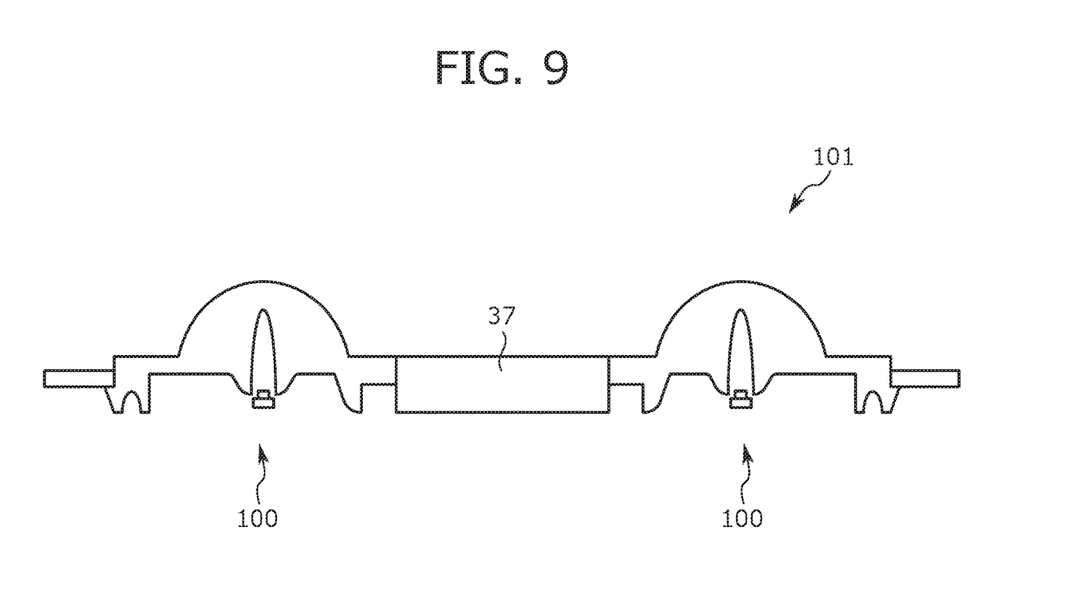
FIG. 9 is a plan view illustrating a shape of a light-emitting unit group in which the plurality of light-emitting units are connected.

Here, based on FIG. 8 and FIG. 9, another configuration example of the lens 30 mounted in the vehicular light-emitting device 1 is described. It should be noted that the example of the lens 30 described below is applicable equally to the vehicular light-emitting device 1A.

In FIG. 8, a configuration example of the lens 30 in a case where a rotation regulating mechanism with respect to the holder 10 is provided in the lens 30 is shown. FIG. 8A shows a plan view of the light-emitting unit 100 including the lens 30 fixed to the holder 10, and FIG. 8B shows a side view of FIG. 8A. As shown in FIGS. 8A and 8B, on both surfaces of the mounting structure part 34 in the lens 30 of the light-emitting unit 100, ribs 36 vertically protruding from the mounting structure part 34 are provided respectively.

As shown in FIG. 8B, the ribs 36 perform a function of regulating a swinging motion of the lens 30 with respect to the holder 10 by abutment of the ribs 36 of the lens 30 against the lens fixing region 18 of the holder 10. It should be noted that the above swinging motion means a rotating motion by which the front end portion of the lens 30 approaches and separates from the holder base part region 16. Thereby, the movement by which the lens 30 is displaced from the initial arrangement with respect to the holder 10 and the LED part 20 can be regulated, and therefore the irradiation direction from the light-emitting unit 100 can be stabilized. Further, since the movement of the lens 30 is regulated, the lens 30 is suppressed from colliding with another member even during vibration of a vehicle, and vibration noise is also reduced.

In the above embodiments, although the example of the structure in which the single light-emitting unit 100 is mounted to the holder 10 has been described, as shown in FIG. 9, a light-emitting unit group 101 in which the plurality of light-emitting units 100 are connected by connection parts 37 may be mounted to the holder 10.

Third Embodiment

Next, based on FIGS. 10 to 13, a vehicular light-emitting device 1B according to a third embodiment of the present disclosure is described.

Figure 10:
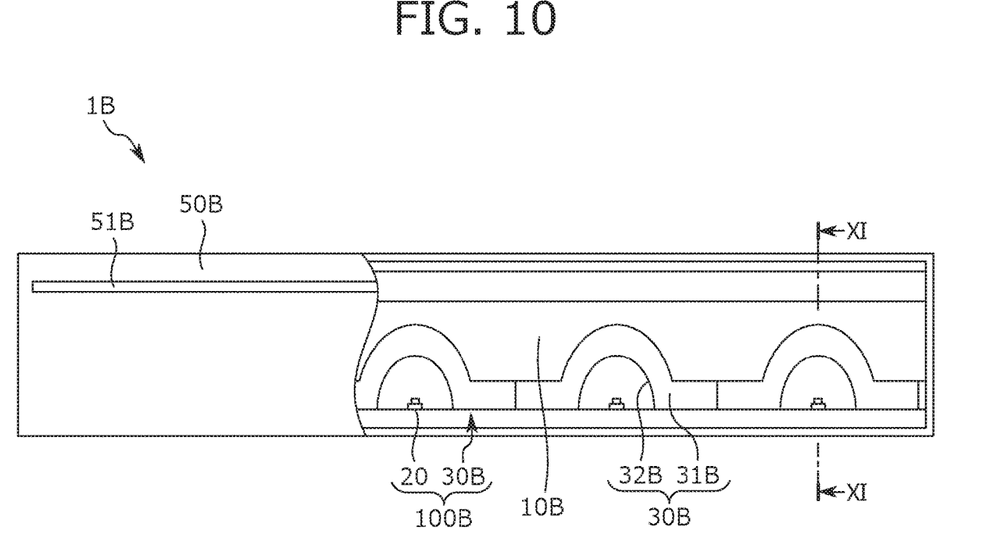
FIG. 10 is a plan view of a vehicular light-emitting device according to a third embodiment.
Figure 11:
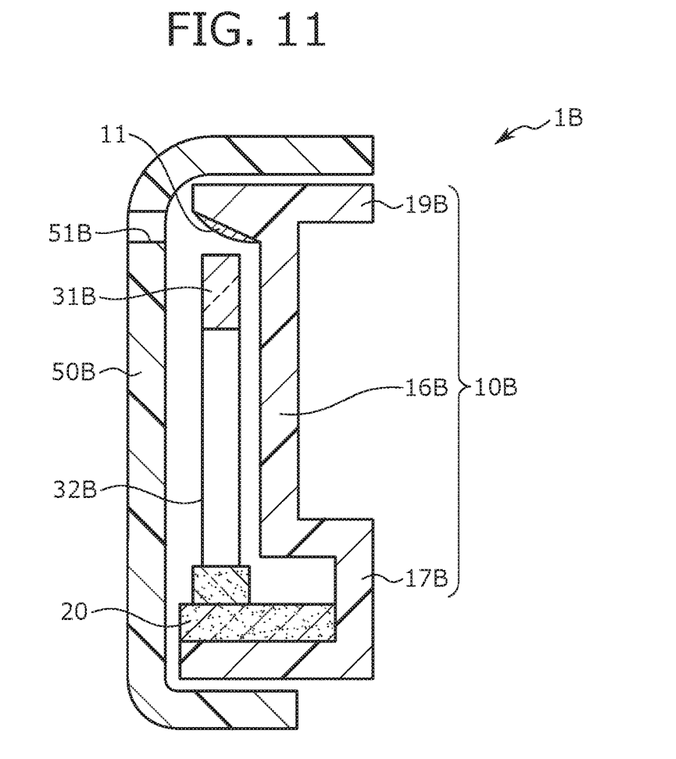
FIG. 11 is a cross-sectional view in XI-XI of FIG. 10.

FIG. 10 is a plan view of the vehicular light-emitting device 1B according to the third embodiment, and FIG. 11 is a cross-sectional view in XI-XI of FIG. 10.

As shown in FIG. 10, the vehicular light-emitting device 1B according to the third embodiment mainly includes a cover 50B, the LED parts 20 serving as the light sources, lenses 30B configured to diffuse and emit the light received from the LED parts 20, and a holder 10B (a holding part) which holds the LED parts 20, the lenses 30B and the like. Moreover, in the holder 10B, the mirror-finished reflection part 11 is provided. The reflection part 11 reflects the refracted light from the lenses 30B toward a window part 51B (a light-emitting surface) of the cover 50B.

As shown in FIG. 10, the lens 30B includes a lens body part 31B, and a notch part 32B provided in a position which is the center of the lens body part 31B and faces the LED part 20. It should be noted that, in the following, the lens 30B and the LED parts 20 arranged in series therewith are formed into a light-emitting unit 100B.

As shown in FIG. 11, the cover 50B has a U-shape, and a light-emitting surface forming surface in which the window part 51B is provided, of the cover 50B, and the lens 30B are substantially parallel. Moreover, the length (the length in a direction perpendicular to the arrangement direction of the light-emitting units 100B) in a front to back direction of the light-emitting surface forming surface is longer compared to the first embodiment. In the following, the window part 51B side of the vehicular light-emitting device 1B is assumed to be the light-emitting surface side, and the opposite side thereof is assumed to be the back surface side.

Moreover, as shown in FIG. 11, the holder 10B has an LED mounting region 17B, a holder base part region 16B, and a reflection part forming region 19B. The LED mounting region 17B is a substantially U-shaped portion to which the LED part 20 is mounted and fixed. The holder base part region 16B is a portion which supports the lens 30B and extends in substantially parallel with the lens 30B from the LED mounting region 17B. The reflection part forming region 19B is a portion extending to the light-emitting surface side from the holder base part region 16B, and is a portion in which the reflection part 11 is provided on an inclined surface, which is the light-emitting surface side, facing the lens 30B. Here, the angle (the inclination angle) of the reflection surface may be set so that the intensity of the reflection light to the window part 51B from the lens 30B becomes a maximum.

Moreover, to the LED part 20, a control circuit (not shown) is connected, and timing of each of the plurality of LED parts 20 is controlled by the control circuit.

Here, as shown in FIG. 10, the lens 30B mounted in the vehicular light-emitting device 1B according to the third embodiment is different from the lens 30 mounted in the vehicular light-emitting device 1 according to the first embodiment in the lens body part 31 (31B), the notch part 32 (32B), and a D-like shape thereof. That is, in the third embodiment, the curvature of the lens body part 31B is larger than the curvature of the lens body part 31 in the first embodiment. Moreover, in the third embodiment, the curvature of the notch part 32B is smaller than the curvature of the notch part 32 in the first embodiment. As thus described, by adjusting the D-like shape of the lens, as shown in FIG. 12 and FIG. 13, a diffusion mode of the light from the lens is adjusted, and the pattern of brightness can be changed.

Figure 12:
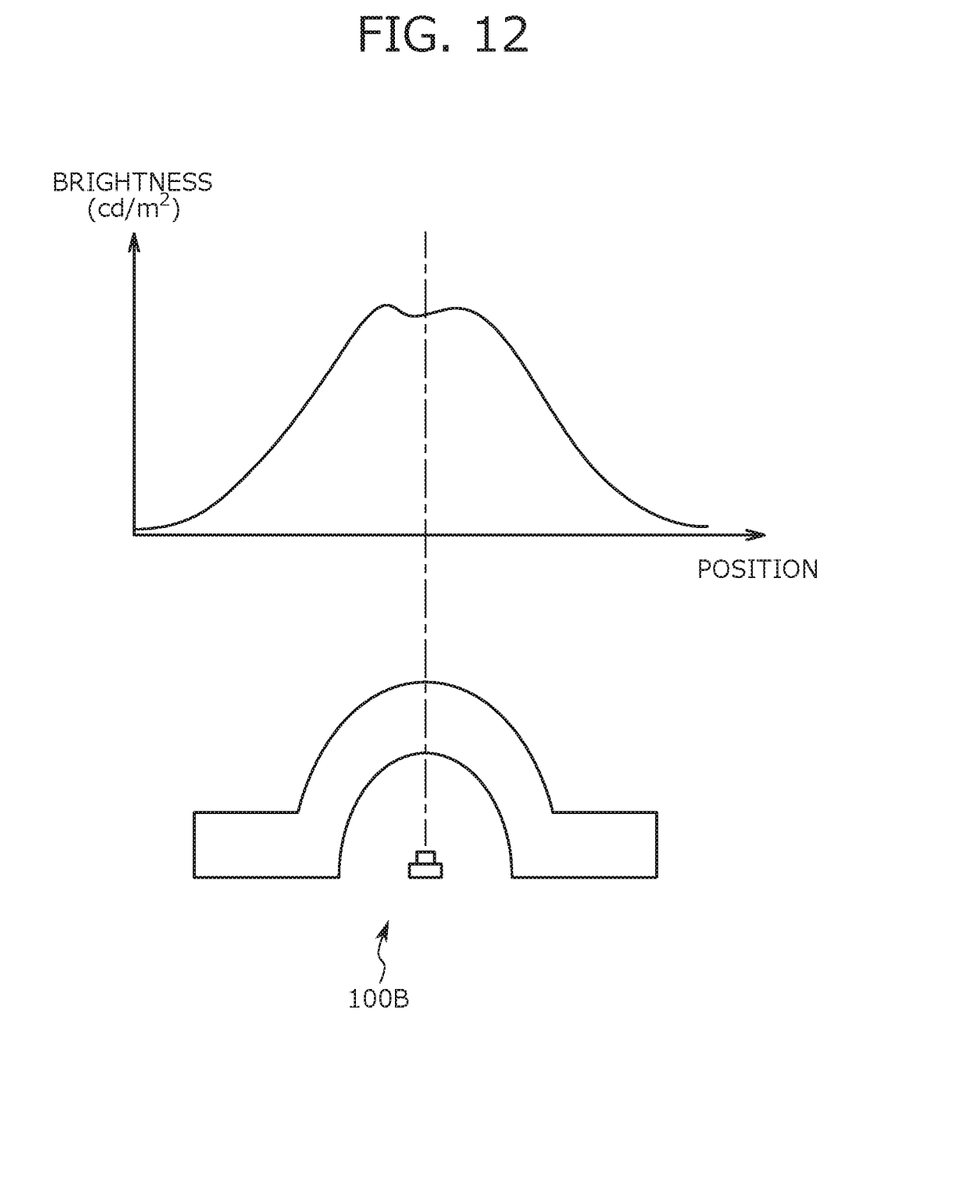
FIG. 12 is a diagram showing the characteristics of brightness peaks of the light-emitting unit according to the third embodiment.

In FIG. 12, the brightness characteristics of the single light-emitting unit 100B according to the third embodiment are shown. FIG. 12 shows a relationship between the position in the light-emitting surface on the front side (that is, the position in the width direction of the light-emitting surface) of the single light-emitting unit 100B and the brightness. As shown in FIG. 12, in the light-emitting unit 100B, a more gentle brightness peak as compared to the light-emitting unit 100 according to the first embodiment exists at a position passing through the center of the notch part 32 from the LED part 20. That is, by the lens 30B according to the third embodiment, the emitted diffusion light is further reduced in brightness unevenness compared to the lens 30 according to the first embodiment.

Figure 13:
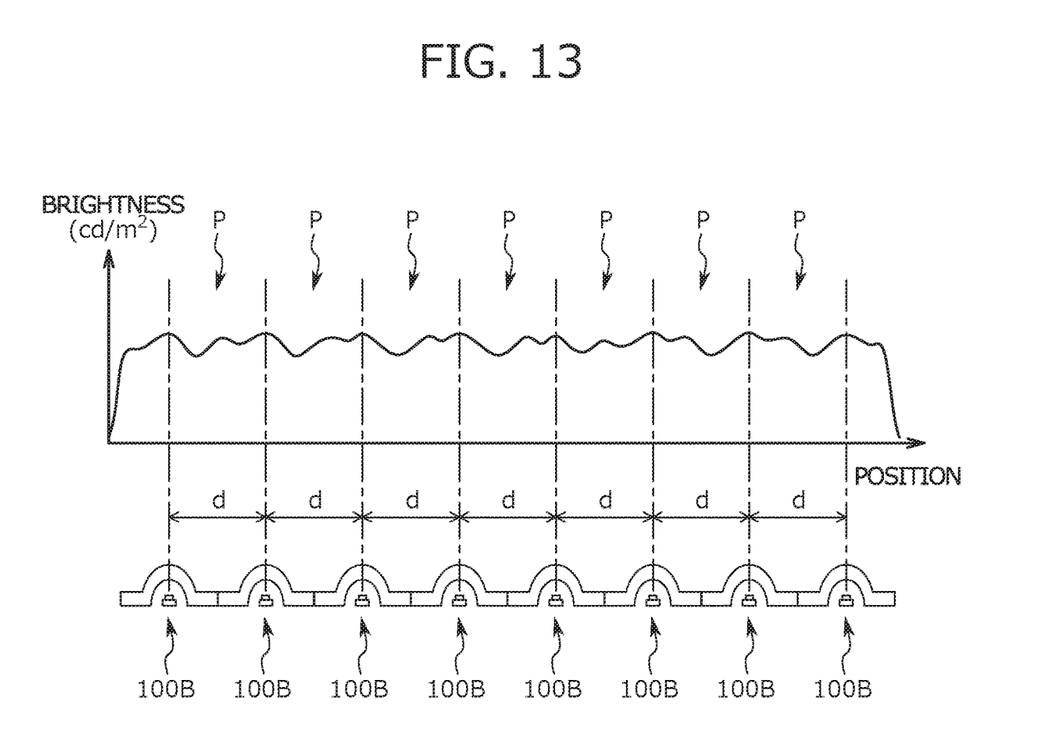
FIG. 13 is a diagram showing the characteristics of brightness peaks of the plurality of light-emitting units, of which arrangement interval is set, in the vehicular light-emitting device according to the third embodiment.

Moreover, in FIG. 13, the brightness characteristics in a case where the plurality of light-emitting units 100B according to the third embodiment are arranged in a predetermined arrangement interval (d) are shown. FIG. 13 shows a relationship between the position in the light-emitting surface on the front side (that is, the position in the width direction of the light-emitting surface) of the plurality of light-emitting units 100B and the brightness. As shown in FIG. 13, by adjusting the arrangement interval of the light-emitting units 100B, brightness peaks exist even between the positions facing the light-emitting units 100B. As thus described, the arrangement interval of the light-emitting units 100B is adjusted, and brightness peaks exist even between the positions facing the light-emitting units 100B in the light-emitting surface, thereby reducing brightness unevenness in the light-emitting surface.

As described above, with respect to the light-emitting unit mounted in the vehicular light-emitting device, by changing the D-like shape of the lens for diffusing the light entered from the LED part, the diffusion mode of the light from the lens is varied. For example, in the vehicular light-emitting device 1 according to the first embodiment, by reducing the curvature of the outer periphery of the lens as compared to the lens according to the third embodiment, the light-emitting unit is miniaturized. Thereby, it is possible to miniaturize the vehicular light-emitting device mounting the light-emitting unit. As thus described, by setting the D-like shape of the lens, the vehicular light-emitting device suppressed in brightness unevenness can be adapted to fit the size of the space demanded by a vehicle.

Hereinbefore, the vehicular light-emitting devices according to the first to third embodiments of the present disclosure have been mainly described. However, the above embodiments are merely an example to facilitate understanding of the present disclosure, and the present disclosure is not limited thereto. The present disclosure can be changed and improved without departing from the gist thereof, and as a matter of course, the present disclosure includes equivalents thereof.

TABLE OF REFERENCE NUMERALS 1, 1A, 1B: Vehicular light-emitting device
10, 10A, 10B: Holder
11: Reflection part
12: Convex part
13: Planar part
14, 15: Insertion hole
16, 16A, 16B: Holder base part region
17, 17A, 17B: LED mounting region
18: Lens fixing region
19, 19B: Reflection part forming region
20: LED part
30, 30B: Lens
31, 31B: Lens body part
32, 32B: Notch part
33: Light source introduction part
34: Mounting structure part
35: Locking pawl part
35a: lock portion
36: Rib
37: Connection part
50, 50A, 50B: Cover
51, 51A, 51B: Window part
60: Concave part
100, 100B: Light-emitting unit
101: Light-emitting unit group

The invention claimed is:

1. A vehicular light-emitting device, comprising:
a plurality of light-emitting units, each of the plurality of light-emitting units comprising a light source and a lens configured to defuse and emit light received from the light source, the plurality of light-emitting units being arranged side by side; and
a holding part configured to hold the plurality of light-emitting units;
wherein:
the plurality of light-emitting units are arranged so that one or more brightness peak values exist between adjacent light-emitting units of the plurality of light-emitting units,
each lens has locking pawl parts at both ends; is fixed to the holding part with a snap-fit by the locking pawl parts, and has light source introduction parts that protrude from a light source side of the lens toward the light source,
a protrusion amount of each of the light source introduction parts is smaller than a protrusion amount of each of the locking pawl parts, and
the light source introduction parts are provided at a back of a lens fixing region of the holding part.

2. The vehicular light-emitting device according to claim 1, wherein
the light emitted from the lenses of the light-emitting units has a plurality of brightness peaks with respect to the spreading direction of the light, and
an arrangement interval of the plurality of light-emitting units is set so that the plurality of brightness peaks of the light emitted from the plurality of light-emitting units are aligned at substantially equal intervals.

3. The vehicular light-emitting device according to claim 1, wherein the holding part has a reflection part which reflects the light emitted from the lenses toward a light-emitting surface.

4. The vehicular light-emitting device according to claim 3, wherein the reflection part is formed with a convex part at a position facing the light source.

5. The vehicular light-emitting device according to claim 3, wherein the holding part is formed with a concave part between the regions which hold the plurality of light-emitting units.

6. The vehicular light-emitting device according to claim 3, further comprising a cover which engages with the holding part and covers the plurality of light-emitting units, wherein the cover has such a shape that at an end portion of the cover on an emission side of the light in the lens of a light-emitting unit, the lens and the cover are closest to each other.

7. The vehicular light-emitting device according to claim 3, wherein each lens is formed with a rib configured to regulate rotation with respect to the holding part.

8. The vehicular light-emitting device according to claim 1, wherein each lens is formed with a notch in a position facing the light source.

9. The vehicular light-emitting device according to claim 8, wherein the light source introduction parts are provided on both sides of the notches.

10. The vehicular light-emitting device according to claim 1, wherein each of the locking pawl parts has a lock portion that protrudes toward an outside of the lens from the locking pawl part.

11. The vehicular light-emitting device according to claim 1, wherein the light source introduction parts protrude from the light source side of the lens, through an insertion hole of the holding part, and toward the light source.

* * * * *